(12) United States Patent
Graham-Cumming et al.

(10) Patent No.: US 8,990,357 B2
(45) Date of Patent: Mar. 24, 2015

(54) METHOD AND APPARATUS FOR REDUCING LOADING TIME OF WEB PAGES

(71) Applicants: John Graham-Cumming, London (GB); Andrew Galloni, London (GB); Albertus Strasheim, San Francisco, CA (US)

(72) Inventors: John Graham-Cumming, London (GB); Andrew Galloni, London (GB); Albertus Strasheim, San Francisco, CA (US)

(73) Assignee: Cloudflare, Inc., San Francisco, CA (US)

( * ) Notice: Subject to any disclaimer, the term of this patent is extended or adjusted under 35 U.S.C. 154(b) by 0 days.

(21) Appl. No.: 13/953,513

(22) Filed: Jul. 29, 2013

(65) Prior Publication Data

US 2015/0032803 A1 Jan. 29, 2015

(51) Int. Cl.
G06F 15/16 (2006.01)
G06F 17/00 (2006.01)
G06F 7/00 (2006.01)
G06F 11/00 (2006.01)
H04L 29/06 (2006.01)

(52) U.S. Cl.
CPC ................................ H04L 29/06047 (2013.01)
USPC ........... 709/219; 709/203; 715/234; 707/709; 726/22

(58) Field of Classification Search
CPC ............ H04L 67/2814; H04L 67/2842; H04L 67/2847; H04L 65/105
USPC ................... 709/203, 219; 715/234; 707/709; 726/22
See application file for complete search history.

(56) References Cited

U.S. PATENT DOCUMENTS

| 6,584,498 | B2 | 6/2003 | Nguyen |
| 7,895,261 | B2 | 2/2011 | Jones et al. |
| 8,285,808 | B1 * | 10/2012 | Joel et al. ...................... 709/213 |
| 8,321,533 | B2 | 11/2012 | Fainberg et al. |
| 2007/0168465 | A1 | 7/2007 | Toppenberg et al. |
| 2009/0276488 | A1 * | 11/2009 | Alstad ........................... 709/203 |
| 2011/0295979 | A1 * | 12/2011 | Alstad et al. .................. 709/219 |
| 2012/0023090 | A1 * | 1/2012 | Holloway et al. ............. 707/709 |
| 2012/0226972 | A1 * | 9/2012 | Fainberg et al. .............. 715/234 |
| 2013/0055384 | A1 * | 2/2013 | Shulman et al. ................ 726/22 |
| 2013/0073401 | A1 | 3/2013 | Cook |

OTHER PUBLICATIONS

Xinfeng Ye; Qiang Liu, "A Study of Schemes for Caching Dynamically Generated Web Pages," Computer and Information Technology, 2006. CIT '06. The Sixth IEEE International Conference on , vol., no., pp. 33,33, Sep. 2006.*

(Continued)

*Primary Examiner* — Taylor Elfervig
(74) *Attorney, Agent, or Firm* — Blakely, Sokoloff, Taylor & Zafman LLP

(57) ABSTRACT

A proxy server receives a request for a web page from a client device. In response to determining that a portion of the web page is available in cache, the proxy server retrieves that portion and transmits it to the client device. The portion of the web page is not the entire web page and is a prediction of the portion of the page that will remain static if the page is reloaded or requested by a different client device. The proxy server transmits a request to an origin server for the full web page. In response to receiving the full web page from the origin server, the proxy server modifies the full web page to remove the portion that was already transmitted to the client device, and transmits the modified web page to the client device.

27 Claims, 8 Drawing Sheets

(56) References Cited

OTHER PUBLICATIONS

Zhu, H.; Tao Yang, "Class-based cache management for dynamic Web content," INFOCOM 2001. Twentieth Annual Joint Conference of the IEEE Computer and Communications Societies. Proceedings. IEEE, vol. 3, no., pp. 1215,1224 vol. 3, 2001.*

R. Fielding et al., Hypertext Transfer Protocol—HTTP/1.1, Network Working Group, Request for Comments: 2616, Jun. 1999, 114 pages.

* cited by examiner

EXAMPLE.COM/INDEX.HTML 310

```
<!doctype html>
<html>
  <head>
    <title>Example Domain</title>
    <link rel="dns-prefetch" href="//example2.com">
    <link rel="stylesheet" type="text/css" media="print" href="printstyles.css">
    <link rel="stylesheet" type="text/css" media="screen" href="styles.css">
    <script type="text/javascript" src="http://example2.com/exampleScript.js" </script>
  </head>
  <body>
    The content ...
    ....
  </body>
</html>
```

320 encompasses the full document; 315 is the head section; 325 is the body section.

FIG. 3

METHOD AND APPARATUS FOR REDUCING LOADING TIME OF WEB PAGES

FIELD

Embodiments of the invention relate to the field of network communication; and more specifically, to reducing loading time of web pages.

BACKGROUND

An important measure of web page performance is how long it takes for a web page to be downloaded sufficiently for the web browser to start displaying the web page (or parts of it) to the user. Many studies have shown that this load time directly affects the user experience, revenue generated, and whether a user even bothers to view the page.

A web page typically includes the base HyperText Markup Language (HTML) and potentially a large number of resources that must be loaded so that the web page can be displayed. These resources may include client-side scripts (e.g., JavaScript), Cascading Style Sheets (CSS), and/or images that are required for the correct layout, appearance, and functioning of the web page. These resources are typically loaded by specifying them using HTML in the so-called 'head' of the web page. The head (delimited by <head> and </head> in the HTML) in the web page appears at the start of the HTML of the web page. The web browser fetches these resources as soon as the head arrives (that is, the web browser typically does not wait until the entire page is delivered to fetch these resources). The resources in the head of the web page should be delivered as quickly as possible so that these resources can be fetched in parallel with the arrival of the rest of the page (which also may include client-side scripts, images, etc.). The head may also specify Domain Name System (DNS) names that the browser uses to look up in parallel to ensure that they are ready for page navigation.

It is also the case that at least part of the head is often unchanging from page load to page load for an individual URL and from user to user. It is common for the head to be generated by a CMS or web server from a common file or program that outputs the list of resources that need to be reloaded. Thus some number of bytes from the start of the web page will be unchanging if the page is reloaded.

BRIEF DESCRIPTION OF THE DRAWINGS

The invention may best be understood by referring to the following description and accompanying drawings that are used to illustrate embodiments of the invention. In the drawings:

FIG. 3 illustrates the HTML of an exemplary web page;

DESCRIPTION OF EMBODIMENTS

Figure 1:
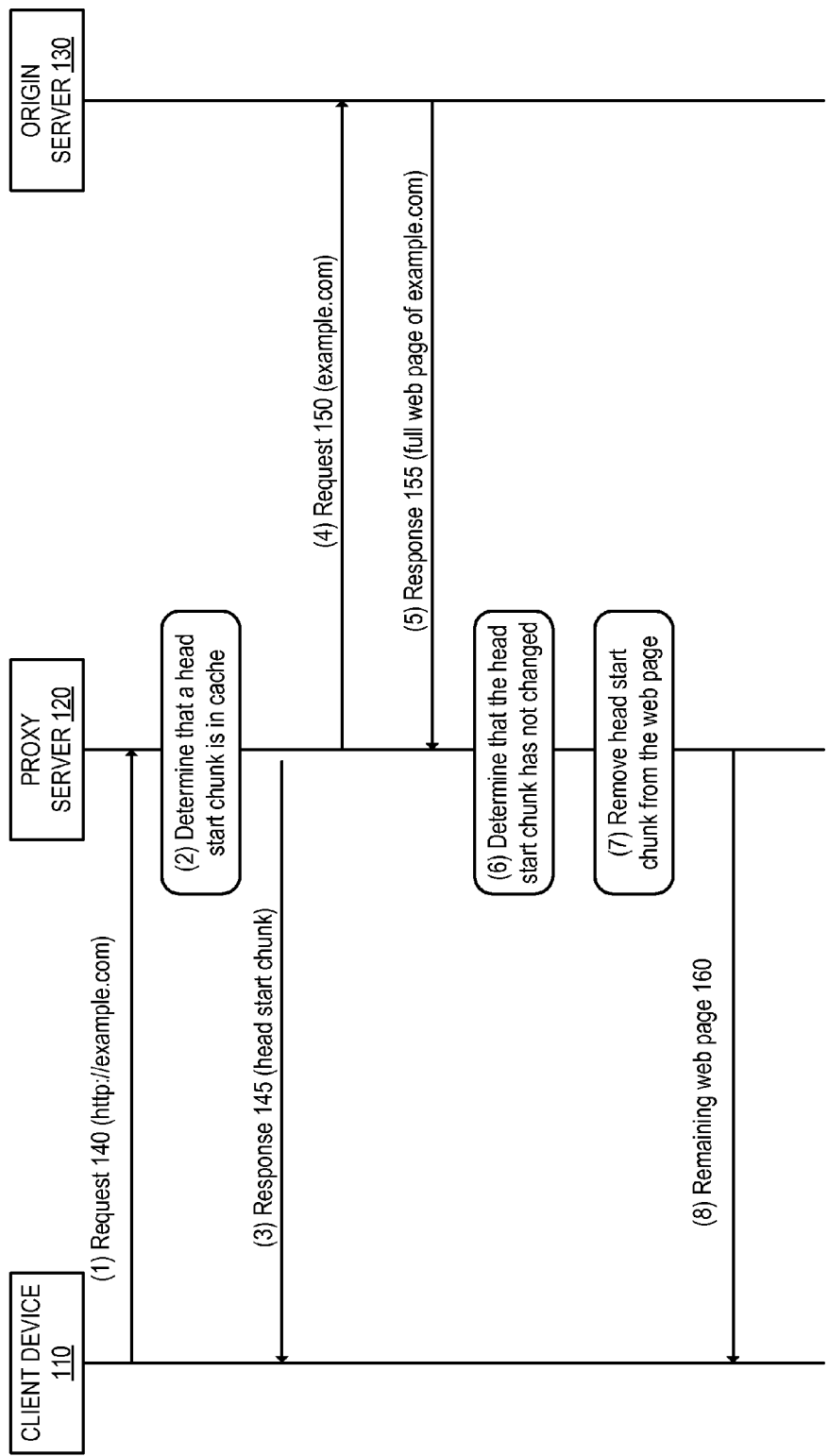
FIG. 1 illustrates an exemplary system for optimistic transmission of a portion of a web page to a requesting client device to reduce the loading time of the web page according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. In the following description and claims, the terms "coupled" along with its derivatives, may be used. "Coupled" is used to indicate that two or more elements, which may or may not be in direct physical or electrical contact with each other, co-operate or interact with each other.

A method and apparatus for optimistically transmitting a portion of a web page to a requesting client prior to retrieving and transmitting the full web page to the client is described, which may reduce the loading time of the web page. As previously described, a web page typically includes the base HTML and potentially a large number of resources that must be loaded so that the web page can be properly displayed. These resources may include client-side scripts (e.g., JavaScript), Cascading Style Sheets (CSS), and/or images that are required for the correct layout, appearance, and functioning of the web page. These resources are typically loaded by specifying them using HTML in the so-called "head" of the web page. The head (delimited by <head> and </head> in the HTML) in the web page appears at the start of the HTML of the web page. The web browser fetches these resources as soon as the head arrives (that is, the web browser typically does not wait until the entire page is delivered to fetch these resources). The resources in the head of the web page should be delivered as quickly as possible so that these resources can be fetched in parallel with the arrival of the rest of the page (which also may include client-side scripts, images, etc.). The head may also specify Domain Name System (DNS) names that the browser uses to look up in parallel to ensure that they are ready for page navigation. For example, FIG. 3 illustrates the HTML of an exemplary web page 310 (example.com/index.html). The head 315 of the web page 310 specifies the name example2.com for DNS prefetching, includes style sheets, and includes a client-side script. The body 325 of the web page 310 includes most of the content of the web page 310.

The content of at least a portion of the head of a web page is often static (it does not change frequently) from page load to page load for an individual URL and from user to user, even though the body of the web page can often by dynamic. The head may be generated by a Content Management System (CMS) or a web server from a common file or program that outputs the list of resources that need to be reloaded. Thus, there may be a number of bytes from the start of the web page that will be unchanged if the page is reloaded.

In one embodiment, for a given URL, a prediction is made of how much of the web page corresponding to that URL is unchanging from load to load and that unchanging portion of the web page is transmitted optimistically to the client device prior to the rest of the web page being retrieved from the appropriate origin server. For example, an offset may be calculated into the web page from its start that is predicted to be unchanging from request to request of the corresponding URL.

Although a portion of the head of a web page is often static, some web pages include dynamic data or data that changes frequently in the head. For example, some news web pages may include metadata in the head that indicates the time that the page was modified, which would change often as different news stories appear on the page. As another example, the web page may allow for personalization such as a custom background that may affect the content of the head from user to user. These dynamic elements of the head may be interspersed in any order with the static elements of the head. In one embodiment, the content of the head is reordered (e.g., by the proxy server) such that the elements that are static are moved to a location prior to elements of the head that are dynamic. Reordering the elements such that the static elements are prior to the dynamic elements may increase the length of the portion of the web page that is optimistically transmitted to the requesting client device. By way of example, the <title> element, the <meta> tag for Content-Type (e.g., <meta http-equiv="Content-Type".../>, the style sheet element(s) that use the <link> tag (e.g., <link rel="stylesheet" type="text/css" media="print" href="printstyles.css">), the client-side script element(s) that use the <script> tag, and the DNS prefetching element (e.g., <link rel="dns-prefetch" href="//example2.com">) are static elements. In one embodiment, the reordering of elements is performed dynamically at the proxy server without requiring the website publisher to change the code of the web page.

In one embodiment, the portion of the page that is optimistically transmitted to requesting clients may also include an added image preloader (e.g., a JavaScript image preloader) that is configured to, when executed by a client device, load one or more images referenced in the body of the web page. For example, a prediction may be made for the image(s) referenced in the body of the web page that are most likely to be loaded and an image preloader may be added (included in the portion of the page that is optimistically transmitted) that is configured to preload those image(s) by making the request(s) for those images before the HTML that includes the references to those images are actually delivered to the client device. The prediction of the image(s) referenced in the body that are most likely to be loaded may be based on an analysis of the page as it is being passed through the proxy server. In another embodiment, the referenced image(s) to be included in the image preloader are defined by the website publisher or other administrator.

The portion of the page that is optimistically transmitted to requesting clients is stored in a cache of a proxy server and is sometimes referred herein as a "head start chunk." In some embodiments the head start chunk consists of the portion of the web page up to and including the entire head. In other embodiments, the head start chunk may include only a portion of the head. In yet other embodiments, the head start chunk includes the entire head and some portion of the body of the web page. Thus, although this portion of the page is sometimes referred herein as the head start chunk, it may not include the entire head of the web page, it may include content of the web page outside of the head, and it may include content not originally part of the web page (such as an image preloader). By way of example with reference to the web page 310 of FIG. 3, the head start chunk 320 includes all of the html up to and including the closing head tag (</head>). The cache storing head start chunks of web pages can be distributed across multiple proxy servers that are distributed geographically such that the head start chunks are stored physically close to end user client devices.

When a request is made for a web page (as referenced through the URL) and the head start chunk for that web page is in cache, the proxy server optimistically transmits the head start chunk to the requesting client device prior to receiving the rest of the web page and in some cases prior to requesting the rest of the web page from the corresponding origin server. The proxy server transmits the head start chunk to the client device with an HTTP 200 OK status code and any other usual HTTP headers to the client device. Upon receiving the head start chunk, the client device can immediately begin to start processing the web page including downloading any resources referenced in the head start chunk, which reduces the loading time of the web page since the client device would otherwise normally have to wait until the origin server begins to return the full web page in order to download those resources. The proxy server makes a request to the origin server for the full web page (as referenced through the URL). After receiving a response from the origin server that includes the full page, the proxy server removes the head start chunk from the web page (assuming that the full page includes the same head start chunk transmitted to the client device, taking into account any reordering of elements that may have been performed or other modification to the head start chunk that was performed) and transmits the remainder of the web page to the client device.

The transmission of the head start chunk is referred to as being optimistic for at least two reasons according to some embodiments described herein. The first is that the proxy server transmits the head start chunk of the web page to the requesting client device before knowing whether the full web page can be successfully retrieved from the origin server. It is possible that the origin server could return an HTTP error code or an HTTP redirect code instead of the full web page after the proxy server has transmitted the head start chunk of the web page. The second reason that the transmission of the head start chunk may be optimistic is that the head start chunk is a prediction of an unchanging portion of the web page in some embodiments. However, that prediction may not always be correct because that portion of the web page could change over time (e.g., the website publisher may modify that portion of the web page).

In one embodiment, the head start chunk may be of a web page that has been designated as being uncacheable. As an example, origin servers may include a "no-cache" directive in the Cache-Control header field of an HTTP response that indicates that a cached version of the resource is not to be used to respond to a request without successful revalidation with the origin server. Previously when the no-cache directive was used, proxy servers checked with the origin server to determine whether the resource has been updated and if it has, the proxy server returned with the entire resource, even if there was a minimal change. However, with the techniques described herein, the proxy server may optimistically transmit the head start chunk of a web page even if that web page has been designated with a no-cache directive by the origin server.

FIG. 1 illustrates an example of the optimistic transmission of a head start chunk according to one embodiment. FIG. 1 includes the client device 110, the proxy server 120, and the origin server 130. The client device 110 is a computing device (e.g., desktop, laptop, workstation, smartphone, palm top, mobile phone, tablet, gaming system, set top box, etc.) that is capable of transmitting and receiving web traffic (e.g., HTTP requests/responses, HTTPS requests/responses, SPDY requests/responses, etc.). The client devices 110 executes a client network application that is capable of transmitting and receiving web traffic. For example, the client network application may be a web browser or other application that can access network resources (e.g., web pages, images, word processing documents, PDF files, movie files, music files, or other computer files). Although FIG. 1 illustrates a single client device communicating with the proxy server 120, it should be understood that typically there are many more client devices that communicate with the proxy server 120 and receive and process the head start chunk as will be described herein.

The proxy server 120 is situated between the client device 110 and the origin server 130 and receives and processes certain traffic between the client device 110 and the origin sever 130. In one embodiment, the proxy server 120 is a reverse proxy server. Web traffic (e.g., HTTP requests/responses, HTTPS requests/responses, SPDY requests/responses, etc.) for domain(s) serviced by the origin server 130 may be received and processed at the proxy server 120. The origin server 130 maintains web page(s) for one or more domains. In the example of FIG. 1, the origin server 130 maintains the web page corresponding to http://example.com. Although FIG. 1 illustrates the proxy server 120 communicating with a single origin server 130, in some embodiments the proxy server 120 communicates and provides services for additional origin servers and different domains that may be owned by different entities. In one embodiment, the proxy server 120 and the services it provides is part of a cloud-based proxy service that provides services for domain owners. By way of example, the cloud-based proxy service may provide a service to reduce the loading time of web pages as will be described in detail herein. The cloud-based proxy service may also provide security services (e.g., detecting and/or mitigating denial of service attacks, proactively stopping botnets, cleaning viruses, trojans, and/or worms, etc.) and/or other performance services and performance services (e.g., acting as a node in a content delivery network (CDN) and dynamically caching customer's files closer to visitors, TCP stack optimizations, etc.).

At an operation 1, the proxy server 120 receives the request 140 for a web page identified with the URL http://example.com from the client device 110. The request 140 is typically an HTTP GET request method. The origin server 130 is the origin server that maintains the web page corresponding to http://example.com. In one embodiment, the proxy server 120 receives the request 140 instead of the origin server 130 because the domain example.com resolves to an IP address of the proxy server 120. Thus, when making a DNS request for example.com, the returned IP address for example.com is an IP address of the proxy server 120. In some embodiments, multiple domains that may be owned by different domain owners may resolve to the proxy server 120 (e.g., resolve to the same IP address or a different IP address of the proxy server 120).

Figure 2:
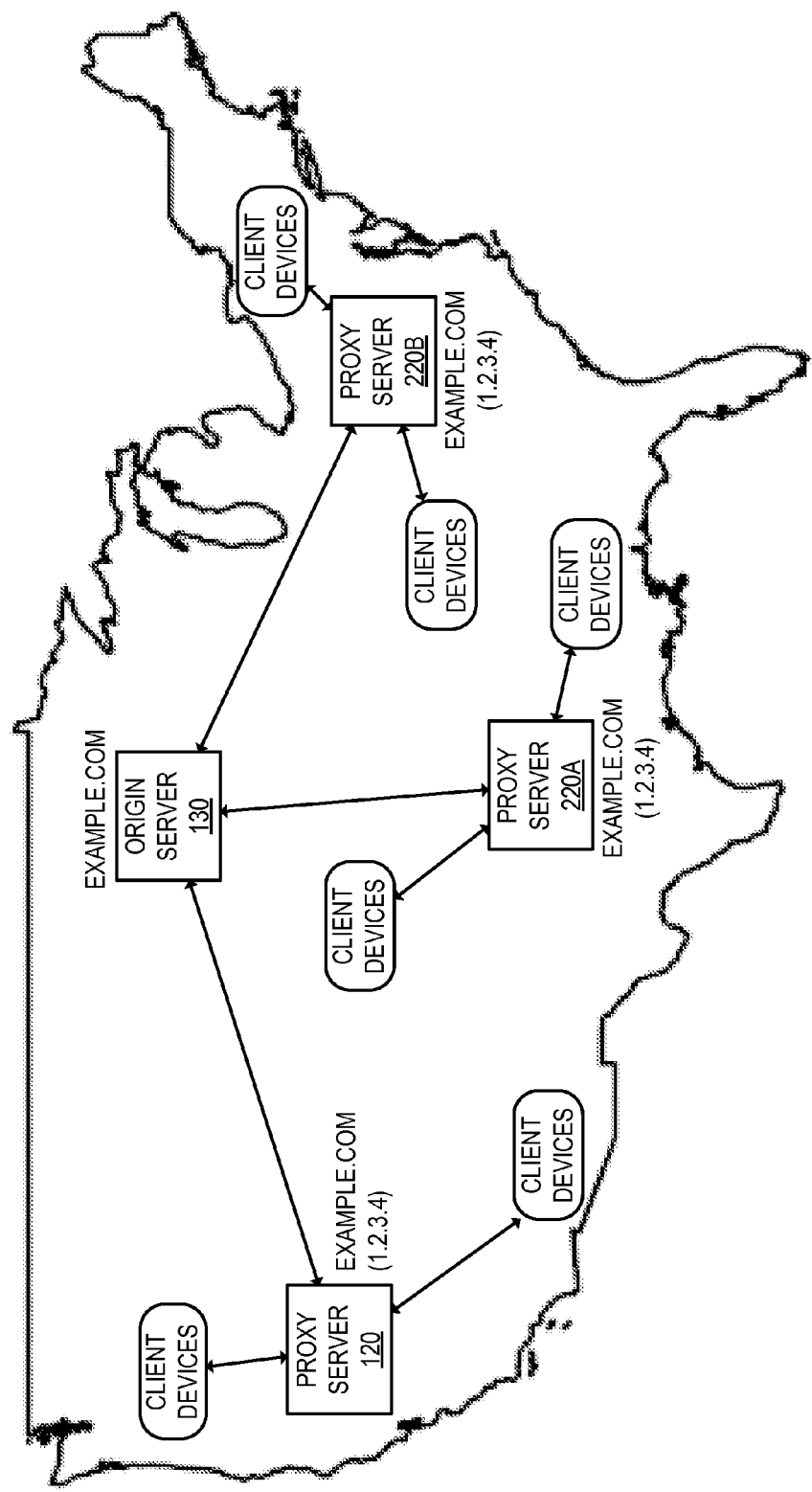
FIG. 2 illustrates an exemplary Anycast network that may be used in some embodiments.

In one embodiment, the proxy server 120 is one of multiple proxy servers that are geographically distributed and are anycasted to the same IP address or the same set of IP addresses. The proxy server 120 may receive the request 140 because it is the closest proxy server to the client device 110 in terms of routing protocol metrics (e.g., Border Gateway Protocol (BGP) metrics) according to an Anycast implementation as determined by the network infrastructure (e.g., the routers, switches, or other network equipment between the client device 110 and the proxy server 120) that is not illustrated in FIG. 1 for simplicity purposes. For example, FIG. 2 illustrates an exemplary Anycast network. As shown in FIG. 2, there are three proxy servers (120 and 220A-B) geographically distributed across the contiguous United States (e.g., the proxy server 120 is located on the West Coast of the US, the proxy server 220A is located in the middle of the US, and the proxy server 220B is located on the East Coast of the US). The domain example.com resolves to the anycasted IP address 1.2.3.4, which may be served by any of the proxy servers 120 and 220A-B. Thus, when sending traffic to the IP address 1.2.3.4, the network infrastructure determines which ones of the proxy servers 120 and 220A-B to direct the traffic to, typically based on the "closest" server (in terms of the routing protocol metrics (e.g., BGP metrics)). Generally speaking, the routing protocol metrics typically have a relationship to physical location. For example, it is likely that traffic to example.com from client devices in the western portion of the US will be directed to the proxy server 120, traffic to "example.com" from client devices located in the middle of the US will be directed at the proxy server 220A, and traffic to "example.com" from client devices located in the Eastern portion of the US will be directed to the proxy server 220B. It should be understood that the Anycast network illustrated in FIG. 2 is exemplary, as there may be, and often are, proxy servers geographically distributed around the world, for example.

After receiving the request 140, the proxy server 120 determines whether there is a head start chunk for the requested web page (according to the URL) stored in cache of the proxy server 120. The cache storing head start chunks of web pages can be distributed across multiple proxy servers that are distributed geographically such that the head start chunks are stored physically close to end user client devices. For example, with reference to FIG. 2, each of the proxy servers 120 and 220A-B may include a cache for storing head start chunks for the same pages and/or different pages. Determining the content of the head start chunk and whether it is suitable for caching for a particular web page will be described in greater detail later herein.

At an operation 2, the proxy server 120 determines that the head start chunk for the requested web page is in cache. By way of example and with reference to FIG. 3, the proxy server 120 determines that the head start chunk 320 is stored in cache. The remaining portion of the web page (e.g., the body 325) may not be stored in the cache of the proxy server 120 and/or be indicated as a resource that should not be cached (e.g., the origin server 130 may have previously transmitted the response with the resource that includes a no-cache directive). For example, the head start chunk may be of a web page that has been designated as being uncacheable by the origin server 130 by including a "no-cache" directive in the Cache-Control header field of a previous HTTP response that indicates that a cached version of the resource is not to be used to respond to a request without successful revalidation with the origin server 130. In one embodiment, the head start chunk may also include an image preloader (e.g., a JavaScript image preloader) that is configured to, when executed by the client device, load one or more images referenced in the body of the web page. In one embodiment, the head start chunk may include elements that have been reordered (e.g., the static element(s) moved prior to the dynamic element(s) in the head start chunk).

The proxy server 120 then generates a response 145 (e.g., an HTTP response) that includes an OK status, any other usual HTTP headers, as well as the head start chunk. The head start chunk may also be compressed (e.g., using gzip compression) to minimize the data sent to the client device. Also, the proxy server 120 may ensure that the head start chunk is in a single gzip chunk by, for example, causing the gzip algorithm to flush compressed data at the end of the head start chunk. The proxy server 120 transmits the response 145 to the client device 110 at operation 3. The proxy server 120 may also transmit the compressed head start chunk with the HTTP headers to minimize the number of TCP packets transmitted to the client device 110. Since the compressed head start chunk is typically relatively small, the proxy server 120 may wait until the compressed head start chunk and the HTTP headers are ready before transmitting to the client device 110 so as to minimize the number of TCP packets transmitted to the client device 110.

Upon receiving the head start chunk in the response 145, the client device 110 can immediately begin to process the web page including downloading the resources referenced in the head start chunk. For example, with reference to FIG. 3, the client device 110 can immediately begin to transmit requests for the resources in the head 315 including the style sheets and client-side script and can also transmit a DNS query to resolve the domain example2.com for DNS prefetching. If the head start chunk also includes an image preloader, the client device 110 can also begin to transmit requests for the image(s) referenced by the image preloader.

At operation 4, the proxy server 120 transmits a request 150 to the origin server 130 for the web page identified with the URL http://example.com. The request 150 is typically an HTTP GET request method. If the proxy server is unable to retrieve the full web page from the origin server 130 after it has optimistically transmitted the head start chunk to the client device 110 (e.g., the origin server 130 returns an HTTP error code (e.g., 4xx status code, 5xx status code) or a redirect code (e.g., 3xx status code) or otherwise is not reachable), the proxy server 120 may cause the client device 110 to refresh or reload the requested web page. For example, the proxy server 120 may transmit a client-side script (e.g., JavaScript) to the client device 110 that, when executed by the client device 110, causes the client device 110 to issue another request for the web page with an indication that optimistic transmission is disabled such that the proxy server will not optimistically transmit the head start chunk to the requesting device. The indication that optimistic transmission is not wanted may be transmitted using a defined parameter appended to the URL being requested or in a cookie.

Instead of causing the client device to refresh or reload the web page if the proxy server is unable to retrieve the full web page after it has optimistically transmitted the head start chunk to the requesting client device, the proxy server may transmit a client-side script (e.g., JavaScript) that, when executed by the client device, replaces the entire page with an error page, which may be the error page returned by the origin server.

The action taken by the proxy server if the proxy server is unable to retrieve the full web page from the origin server after it has optimistically transmitted the head start chunk to the requesting client device may depend on the reason why the web page could not be retrieved. For example, if the origin server returns a 4xx status code, the proxy server may transmit a client-side script to the client device that will replace the page with the error page corresponding to the 4xx status code. As another example, if the origin server returns a 3xx status code, the proxy server may transmit a client-side script to the client device that, when executed by the client device, causes the client device to issue another request for the web page with the indication that optimistic transmission is disabled.

Assuming that the origin server 130 is able to respond to the request 150 with the requested resource, the proxy server 120 receives the response 155 from the origin server 130 at operation 5. The response 155 includes the full web page of example.com. The response 155 may also include one or more cookies set by the origin server 130.

As described above, in some embodiments there is no guarantee that that the portion of the web page for optimistic transmission (the head start chunk) will remain static upon request to request. For example the website publisher may change that portion of the web page. Thus, after receiving the response 155, the proxy server 120 determines whether the head start chunk transmitted to the client device 110 is the same as the same portion of the web page received in the response 155. For example, the proxy server 120 may compare the start of the full web page received in the response 155 from the origin server 130 with the head start chunk transmitted to the client device 110 in the response 145 to determine whether they are different. This may be done by comparing a hash of the head start chunk transmitted to the client device 110 against a hash of the same part of the web page received in the response 155 from the origin server 130 or through a string comparison.

If the head start chunk has changed, the proxy server 120 transmits the full web page to the client device 110 or transmits a client-side script that, when executed by the client device 110, causes the client device 110 to issue another request for the web page (to be received by the proxy server 120) with an indication that optimistic transmission is disabled (e.g., using a defined parameter appended to the URL or a value in a cookie). If the proxy server 120 transmits the full web page to the client device 110, prior to transmitting the full web page to the client device 110, the proxy server 120 may modify the web page to include a client-side script (e.g., JavaScript) that, when executed by the client device 110, will cause the client device 110 to discard the head start chunk that has already been received by the client device 110.

As previously described, some web pages include dynamic data or data that changes frequently in the head. These dynamic elements of the head may be interspersed in any order with the static elements of the head. In one embodiment, the proxy server 120 reorders the content of the head such that the elements that are static are moved to a location prior to elements of the head that are dynamic. For example, the proxy server 120 scans the html to locate static elements of the HTML included in the response 155 and reorders them (if necessary) such that they will be in the HTML prior to dynamic elements. Example elements that are typically static include the <title> element, the <meta> tag for Content-Type (e.g., <meta http-equiv="Content-Type".../>, the style sheet element(s) that use the <link> tag (e.g., <link rel="stylesheet" type="text/css" media="print" href="printstyles.css">), the client-side script element(s) that use the <script> tag, and the DNS prefetching element (e.g., <link rel="dns-prefetch" href="//example2.com">). The same reordering is done when generating the head start chunk to store in the cache of the proxy server 120 such that the reordered head start chunk and the reordered web page from the origin serve 130 may be compared to determine any changes. In one embodiment, the order in which these static elements originally appear are preserved in the reordering. In another embodiment, the static elements are grouped according to type (e.g., style sheet elements, client-side script elements, DNS prefetching element, etc.) and within that grouping the relative ordering of the static element(s) is preserved.

In the example illustrated in FIG. 1, the proxy server 120 determines that the head start chunk has not changed in operation 6. Since the proxy server 120 has already transmitted the head start chunk to the client device 110 in the response 145, the proxy server 120 removes that portion of the web page prior to transmitting the remainder of the web page to the client device 110. Thus, at operation 7, the proxy server 120 removes the head start chunk from the web page. The proxy server 120 then transmits the remaining part of the web page 160 to the client device 110 at operation 8.

Cookie(s) that are set by the origin server 130 for the requested web page will typically be unknown at the time of the proxy server 120 transmitting the head start chunk to the client device 110. Cookies are usually set using a Set-Cookie header of the response; however the proxy server 120 cannot set the cookie(s) in the header of the response because the proxy server 120 already transmitted the header to the client device 110 when transmitting the head start chunk of the web page in operation 3. In one embodiment, the proxy server 120 uses a Trailer of HTTP Transfer-Encoding defined in RFC 2616 (e.g., section 14.40 of RFC 2616) in order to set the cookie(s) in Set-Cookie header(s) when transmitting the remaining web page in operation 8. In another embodiment, the proxy server 120 modifies the web page further to include a client-side script (e.g., JavaScript) that, when executed by the client device, sets the cookie(s) programmatically inline. The client-side script may be located in the HTML immediately after the location in HTML where the head start chunk transmitted to the client device would be located.

Figure 4:
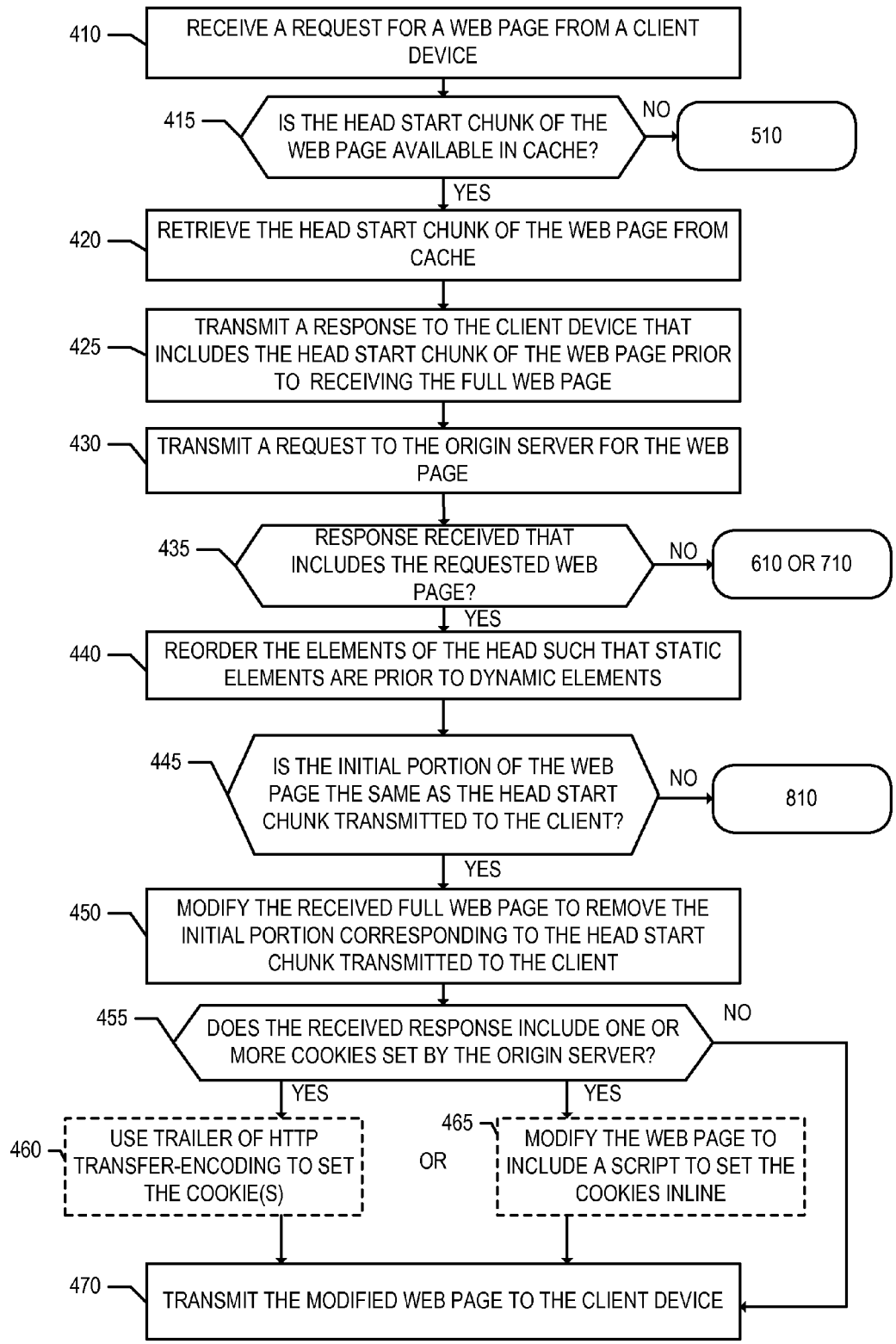
FIG. 4 is a flow diagram that illustrates exemplary operations for reducing the loading time of web pages including a proxy server optimistically transmitting a portion of a web page to a requesting client device prior to the proxy server retrieving and transmitting the full web page to the requesting client device according to one embodiment.

FIG. 4 is a flow diagram that illustrates exemplary operations for reducing the loading time of web pages including a proxy server optimistically transmitting a portion of a web page to a requesting client device prior to the proxy server retrieving and transmitting the full web page to the requesting client device according to one embodiment. The operations of this and other flow diagrams will be described with reference to the exemplary embodiment of FIG. 1. However, it should be understood that the operations of the flow diagrams can be performed by embodiments of the invention other than those discussed with reference to FIG. 1, and the embodiments of the invention discussed with reference to FIG. 1 can perform operations different than those discussed with reference to the flow diagrams.

At operation 410, the proxy server 120 receives, from the client device 110, a request for a web page at a domain. The request includes a URL that specifies the location of the requested web page. In one embodiment, the proxy server 120 receives this request due to the domain resolving to an IP address of the proxy server 120 instead of the origin server 130 which maintains the requested web page. In one embodiment, the IP address is Anycasted to multiple proxy servers and the proxy server 120 receives this request because it is the closest proxy server of the multiple proxy servers to the client device in terms of routing protocol metrics (e.g., Border Gateway Protocol (BGP) metrics) according to an Anycast implementation, as determined by the network infrastructure. Flow then moves to operation 415.

In one embodiment, after receiving the request, the proxy server 120 determines whether the request includes an indication that optimistic transmission of the head start chunk of the requested web page is disabled or not wanted. This indication may be a defined parameter appended to the URL in the request or a value in a cookie. If the request indicates that optimistic transmission of the head start chunk is disabled or not wanted, then the proxy server 120 transmits a request to the origin server 130 for the requested web page and returns the response from the origin server 130 to the requesting client device 110.

At operation 415, the proxy server 120 determines whether the portion of the requested web page for optimistic transmission is available in cache of the proxy server 120 (the head start chunk of the page). If it is, then flow moves to operation 420, otherwise flow moves to operation 510 which will be described in greater detail with respect to FIG. 5. At operation 420, the proxy server 120 retrieves the head start chunk of the web page from its cache. Flow moves from operation 420 to operation 425.

At operation 425, the proxy server 120 transmits a response to the requesting client device 110 that includes the retrieved head start chunk of the requested web page. The response is transmitted to the client device 110 prior to the proxy server 120 receiving the full web page (and may be prior to the proxy server 120 transmitting a request to the origin web server 130 for the full web page). The response includes an HTTP 200 OK status and any other usual HTTP headers. The proxy server 120 may also compress the head start chunk (e.g., using gzip compression) to minimize the amount of data sent to the client device 110. Also, the proxy server 120 may ensure that the head start chunk is in a single gzip chunk by, for example, causing the gzip algorithm to flush compressed data at the end of the head start chunk. The proxy server 120 may also transmit the compressed head start chunk with the HTTP headers to minimize the number of TCP packets transmitted to the client device 110. Since the compressed head start chunk is typically relatively small, the proxy server 120 may wait until the compressed head start chunk and the HTTP headers are ready before transmitting to the client device 110 so as to minimize the number of TCP packets transmitted to the client device 110.

It should be noted that the proxy server 120 transmits this head start chunk of the web page to the client device 110 with an HTTP 200 OK status prior to actually receiving the full web page from the origin server 130 and it is possible that the origin server 130 could return an HTTP error code or HTTP redirect code after the head start chunk of the web page is transmitted to the client device 110.

Upon receiving the head start chunk, the client device 110 can immediately begin to process the web page including downloading the resources referenced in the head start chunk of the web page prior to receiving the rest of the web page, which reduces the loading time of the web page. By way of example, if the head start chunk includes all or part of the head of the web page, which as described above may include references to one or more resources, the client network application of the client device will fetch those resources as the head arrives. If the head start chunk also includes an image preloader, the client device 110 can also begin to transmit requests for the image(s) referenced by the image preloader prior to the HTML that includes those reference(s) to those image(s) actually being received by the client device 110.

Referring back to FIG. 4, flow moves from operation 420 to operation 430 where the proxy server 120 transmits a request to the origin server 130 for the full web page (e.g., an HTTP GET request for the web page). The request may be transmitted to the origin server 130 before, after, or in parallel with transmitting the response including the head start chunk to the client device 110 of operation 425. Flow moves from operation 430 to operation 435.

At operation 435, the proxy server 120 determines whether a response is received from the origin server 130 that includes the requested web page. As previously described, it is possible that the origin server 130 could return an HTTP error code (e.g., 4xx status code, 5xx status code) or a redirect (e.g., 3xx status code). It is also possible that no response is received from the origin server 130 (e.g., the origin server is offline). Of course, it is also possible that the origin server 130 returns a response that includes the requested web page. If a response is received from the origin server 130 that includes the requested web page, then flow moves to operation 440, otherwise flow moves to operation 610 in one embodiment or to operation 710 in another embodiment.

Some web pages include dynamic data or data that changes frequently in the head. For example, some news web pages may include metadata in the head that indicates the time that the page was modified, which would change often as different news stories appear on the page. These dynamic elements of the head may be interspersed in any order with the static elements of the head. In one embodiment, the proxy server 120 reorders the content of the head such that the elements that are static are moved to a location prior to elements of the head that are dynamic. Reordering the elements such that the static elements are prior to the dynamic elements may increase the length of the head start chunk. By way of example, the <title> element, the <meta> tag for Content-Type (e.g., <meta http-equiv="Content-Type".../>, the style sheet element(s) that use the <link> tag (e.g., <link rel="stylesheet" type="text/css" media="print" href="printstyles.css">), the client-side script element(s) that use the <script> tag, and the DNS prefetching element (e.g., <link rel="dns-prefetch" href="//example2.com">) are static elements. Thus, in one embodiment, at operation 440, the proxy server 120 reorders the elements of the head of the page received from the origin server 130 such that the static elements are prior to the dynamic elements of the head of the page. For example, the proxy server 120 scans the HTML of the head to locate static elements of the HTML and reorders them (if necessary) such that they will be in the HTML prior to dynamic element(s) of the head. In one embodiment, the order in which these static elements originally appear are preserved in the reordering. In another embodiment, the static elements are grouped according to type (e.g., style sheet elements, client-side script elements, DNS prefetching element, etc.) and within that grouping the relative ordering of the static element(s) is preserved. Operation 440 is optional in some embodiments. Flow moves from operation 440 to operation 445.

As previously described, the proxy server 120 transmits a portion of the requested web page that is anticipated to be static (will not change) from request to request (the head start chunk). However, in some embodiments there is no guarantee that this portion of the page will remain static. Therefore, in some embodiments, after receiving the full web page from the origin server 130, the proxy server 120 determines whether the head start chunk transmitted to the client device 110 differs from the same portion of the full web page received from the origin server, taking into account any reordering of elements that may have been performed when generating the head start chunk or any other modification performed on that portion of the requested web page.

Thus, at operation 445, the proxy server 120 determines whether the head start chunk of the web page transmitted to the client device 110 in operation 425 is the same as the same portion (e.g., the same offset into the page) of the full web page received from the origin server 130. For example, the proxy server 120 may compare the start of the full web page obtained from the origin server 130 (after performing the same modification, if any, that was performed when generating the head start chunk) with the portion of the page transmitted to the client device 110 to see if they differ. This may be done by comparing a hash of the portion of the page transmitted to the client device 110 against a hash of the same number of bits of the full web page or through a string comparison. If the head start chunk of the web page that was transmitted to the client device 110 is the same as the portion of the web page received from the origin server 130, then flow moves to operation 450, otherwise flow moves to operation 810.

At operation 450, the proxy server 120 modifies the full web page by removing the portion of the web page 120 corresponding to the head start chunk that it has already transmitted to the client device 110 in operation 425. For example, the proxy server deletes that portion of the web page from the HTML of the web page. Flow then moves to operation 455.

Cookie(s) that are set by the origin server 130 for the requested web page will typically be unknown at the time of the proxy server 120 transmitting the portion of the web page to the requesting client device 110. At operation 455, the proxy server 120 determines whether the received response includes one or more cookies set by the origin server 130. If the response does not include cookie(s) set by the origin server 130, then flow moves to operation 470. Cookies are usually set using a Set-Cookie header of the response; however the proxy server 120 cannot set the cookie(s) in the header of the response because the proxy server 120 already transmitted the header to the client device 110 when transmitting the head start chunk of the web page. In one embodiment, the proxy server 120 uses a Trailer of HTTP Transfer-Encoding in order to set the cookie(s) in Set-Cookie header(s). In such an embodiment, flow moves from operation 455 to operation 460. In another embodiment, the proxy server 120 modifies the web page further to include a client-side script (e.g., JavaScript) that, when executed by the client device 110, sets the cookie(s) programmatically inline. The client-side script may be located in the HTML immediately after the location in HTML where the head start chunk transmitted to the client device 110 would be located. In such an embodiment, flow moves from operation 455 to operation 465. Flow moves from both operations 460 and 465 to operation 470.

At operation 470, the proxy server 120 transmits the modified web page to the client device. The client device receives and processes the modified web page including requesting any other resource that may be in the remaining portion of the web page (e.g., in the body of the web page).

The portion of the web page that is cached by the proxy server for optimistic transmission (the head start chunk) may be determined differently in different embodiments. In one embodiment, the head start chunk of a particular web page is defined by the website publisher or other administrator. For example, the website publisher or other administrator may define the head start chunk of the web page to be everything up to and including the closing head tag (</head>). As another example, the website publisher may define the elements in the head which are typically static. In another embodiment, the head start chunk of a particular web page is determined dynamically based on an observation of a number of requests for the URL and examining the web pages returned for that URL to determine whether there is a portion of the web page that is suitable for optimistic transmission (e.g., a portion that appears to remain static upon request to request).

Figure 5:
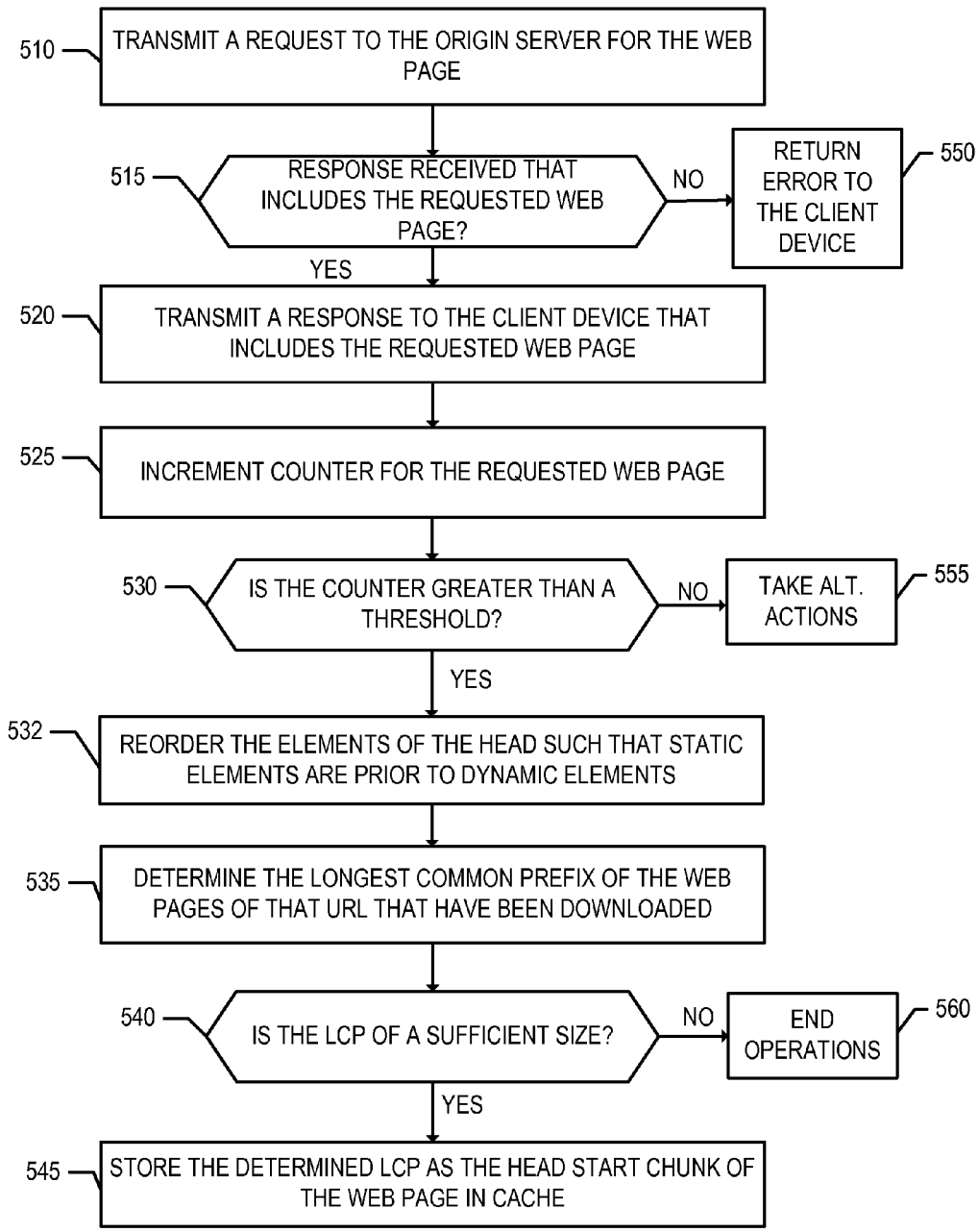
FIG. 5 is a flow diagram that illustrates exemplary operations for dynamically determining the portion of the web page to store in cache for optimistic transmission of that portion to requesting client devices according to one embodiment.

FIG. 5 is a flow diagram that illustrates exemplary operations for dynamically determining the portion of the web page to store in cache for optimistic transmission of that portion to requesting client devices according to one embodiment. As described above with respect to FIG. 4, in one embodiment the operations of FIG. 5 are performed if the portion of the requested web page (the head start chunk) is not available in cache of the proxy server.

At operation 510, the proxy server 120 transmits a request to the origin server 130 for the requested web page (e.g., an HTTP GET request for the web page). Flow then moves to operation 515 where the proxy server 120 determines whether a response is received that includes the requested web page. As previously described, it is possible that the origin server 130 could return an HTTP error code (e.g., 4xx status code, 5xx status code) or a redirect (e.g., 3xx status code). It is also possible that no response is received from the origin server 130 (e.g., the origin server is offline). Of course, it is also possible that the response includes the requested web page. If a response is received from the origin server 130 that includes the requested web page, then flow moves to operation 520, otherwise flow moves to operation 550 and the proxy server 120 transmits a response to the client device 110 that indicates that the requested web page could not be retrieved and may provide an appropriate status code (e.g., 4xx status code, 5xx status code). At operation 520, the proxy server 120 transmits a response to the client device 110 that includes the requested web page. Flow then moves from operation 520 to operation 525.

In one embodiment the proxy server 120 determines the head start chunk of the web page for optimistic transmission after observing a certain number of requests for the URL of the web page and corresponding downloads of the web page corresponding to that URL from the origin server 130. This increases the accuracy of the prediction that the head start chunk of the web page remains static (unchanging) when the page is reloaded.

At operation 525, the proxy server 120 increments a counter for the requested web page. Flow then moves from operation 525 to operation 530 where the proxy server determines whether the counter is greater than a threshold (e.g., 1000 requests to that URL). If the counter is not greater than the threshold, then flow moves to operation 555 where alternative actions are taken (e.g., at least a portion of the requested web page may be stored for future determination of the static portion of the web page, which may be stored after the operation described in operation 532). If the counter is greater than the threshold, then flow moves to operation 532.

At operation 532, which is optional in some embodiments, the proxy server 120 reorders the elements of the head of the page received from the origin server 130 such that the static elements are prior to the dynamic elements of the page. For example, the proxy server 120 scans the html of the page to locate static elements of the HTML and reorders them (if necessary) such that they will be in the html prior to dynamic elements.

Flow moves from operation 532 to operation 535 where the proxy server 120 determines the longest common prefix (LCP) of the web pages of that URL that the proxy server has downloaded from the origin server (after any reordering performed in operation 532). The LCP may be determined using a number of algorithms including those that use tries. For example, the algorithm may build a trie or suffix array to determine the LCP. Alternatively, an algorithm that performs a linear search through the pages of the URL that have been downloaded (after any reordering performed in operation 532) may be performed to determine the LCP. As another option, a binary search through the pages of the URL that have been downloaded (after any reordering performed in operation 532) may be performed to determine the LCP. Flow moves from operation 535 to operation 540.

At operation 540, the proxy server 120 determines whether the determined LCP is of a sufficient size to be useful for optimistic transmission to requesting client devices. For example, if the LCP is too small to contain any references to resources it is not suitable for optimistic transmission and likely means that the initial portion of the web page is not static. In one embodiment, a threshold is used to determine if the LCP is of a sufficient size. In another embodiment, proxy server 120 determines whether the LCP includes everything up to and including the closing head tag (</head>). If the LCP is not of a sufficient size, then flow moves to operation 560 where the operations end. If the LCP is of a sufficient size, then flow moves to operation 545 where the proxy server 120 stores the determined LCP as the head start chunk of the web page in cache for use optimistic transmission upon receiving future requests for that URL. In embodiments where the proxy server 120 is one of multiple proxy servers that are anycasted to the same address and may receive requests for the web page from client devices depending on the location of those client devices, the proxy server 120 may cause the head start chunk to be transmitted to those other proxy servers so that they may transmit the head start chunk optimistically.

As previously described, in some embodiments an image preloader is added to the head start chunk to cause the client device to load one or more image(s) referenced in the body of the page. In such embodiments, the image preloader may be added prior to determining the LCP in operation 535 or may be added after determining the LCP in operation 535.

Figure 6:
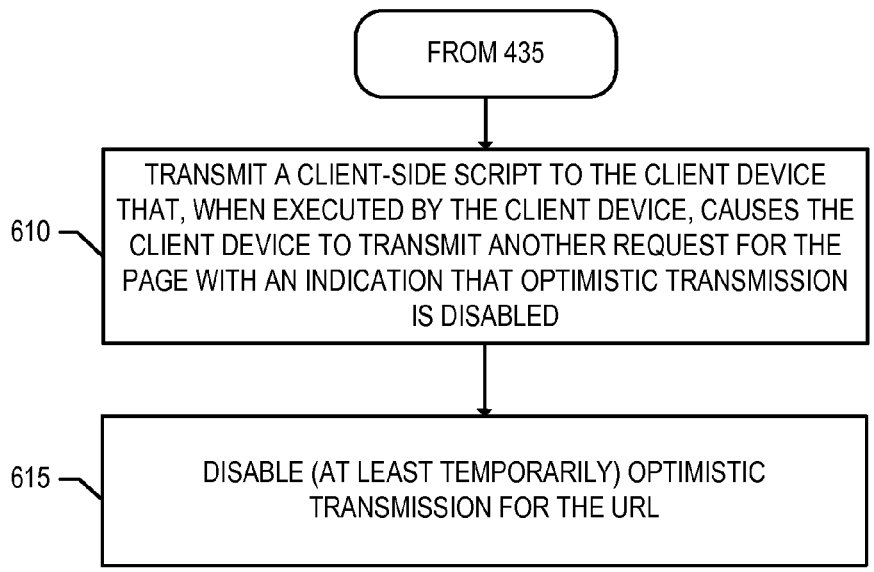
FIG. 6 is a flow diagram that illustrates exemplary operations performed by the proxy server when the proxy server is unable to retrieve the full web page from the origin server after it has optimistically transmitted the head start chunk to a requesting client device according to one embodiment.

FIG. 6 is a flow diagram that illustrates exemplary operations performed by the proxy server when the proxy server is unable to retrieve the full web page from the origin server after it has optimistically transmitted the head start chunk to a requesting client device according to one embodiment. At operation 610, the proxy server 120 transmits a client-side script to the client device that, when executed by the client device 110, causes the client device 110 to transmit another request for the web page with an indication that optimistic transmission is disabled. This indication may be a defined parameter appended to the URL or a value in a cookie. When the proxy server 120 receives a request with this indication, the proxy server 120 will transmit a request to the origin server 130 for the requested web page and return the response from the origin server 130 to the requesting client device 110. Flow moves from operation 610 to operation 615 where the proxy server 120 disables, at least temporarily, optimistic transmission for the URL across all requests from client devices. The optimistic transmission of the head start chunk for a particular web page may be disabled until the proxy server 120 observes a number of responses from the origin server 130 with a 200 OK status code and the requested web page.

Figure 7:
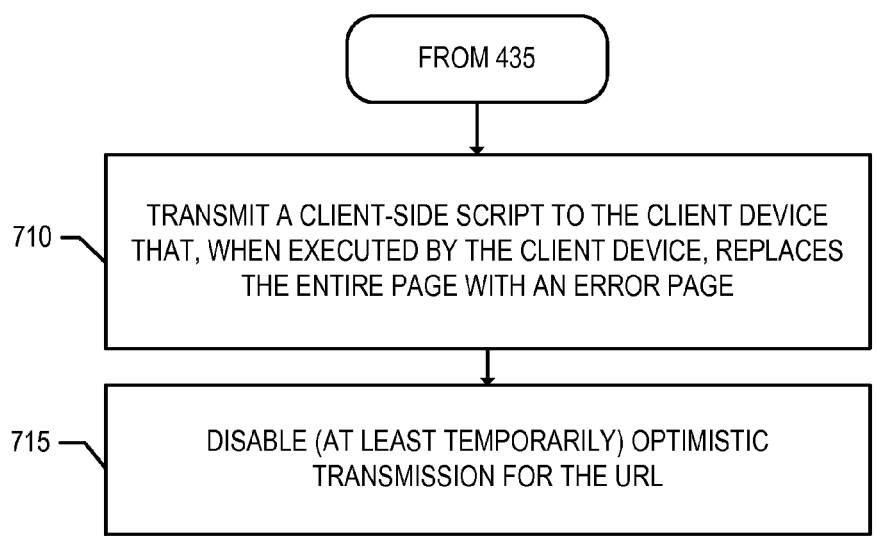
FIG. 7 is a flow diagram that illustrates exemplary operations performed by the proxy server when the proxy server is unable to retrieve the full web page from the origin server after it has optimistically transmitted the head start chunk to a requesting client device according to another embodiment.

FIG. 7 is a flow diagram that illustrates exemplary operations performed by the proxy server when the proxy server is unable to retrieve the full web page from the origin server after it has optimistically transmitted the head start chunk to a requesting client device according to another embodiment. At operation 710, the proxy server 120 transmits a client-side script to the client device 110 that, when executed by the client device 110, causes the client device 110 to replace the portion of the page that it has received from the proxy server 120 with an error page, which may be the error page returned by the origin server 130. The client device 110 may discard the portion of the page that it previously received from the proxy server 120. Flow moves from operation 710 to operation 715 where the proxy server 120 disables, at least temporarily, optimistic transmission for the URL across all requests from client devices as similarly described above with respect to FIG. 6. If the proxy server 120 is able to retrieve the full web page later (e.g., if the origin server is temporarily down or overloaded and now is back up), the proxy server 120 may resume optimistic transmission for the URL.

Figure 8:
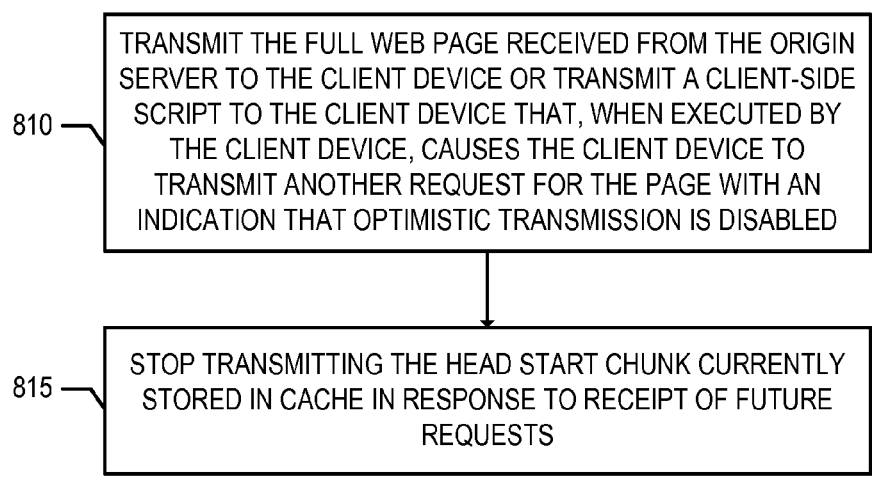
FIG. 8 is a flow diagram that illustrates exemplary operations performed by the proxy server when the head start chunk transmitted to the client device is different than the same portion of the full web page received from the origin server (taking into account any modification of the page when generating the head start chunk) according to one embodiment.

FIG. 8 is a flow diagram that illustrates exemplary operations performed by the proxy server when the head start chunk transmitted to the client device is different than the same portion of the full web page received from the origin server (taking into account any modification of the page when generating the head start chunk) according to one embodiment. At operation 810, the proxy server 120 transmits the full web page received from the origin server 130 to the client device 110 or transmits a client-side script that, when executed by the client device 110, causes the client device 110 to issue another request for the web page with an indication that optimistic transmission is disabled or not wanted (e.g., using a defined parameter appended to the URL or a value in a cookie). Flow then moves to operation 815 where the proxy server 120 stops transmitting the head start chunk currently stored in cache in response to receipt of future requests from client devices. The proxy server 120 may remove that head start chunk from its cache. The proxy server 120 may then perform the operations in FIG. 5 to determine a new head start chunk for the web page.

Figure 9:
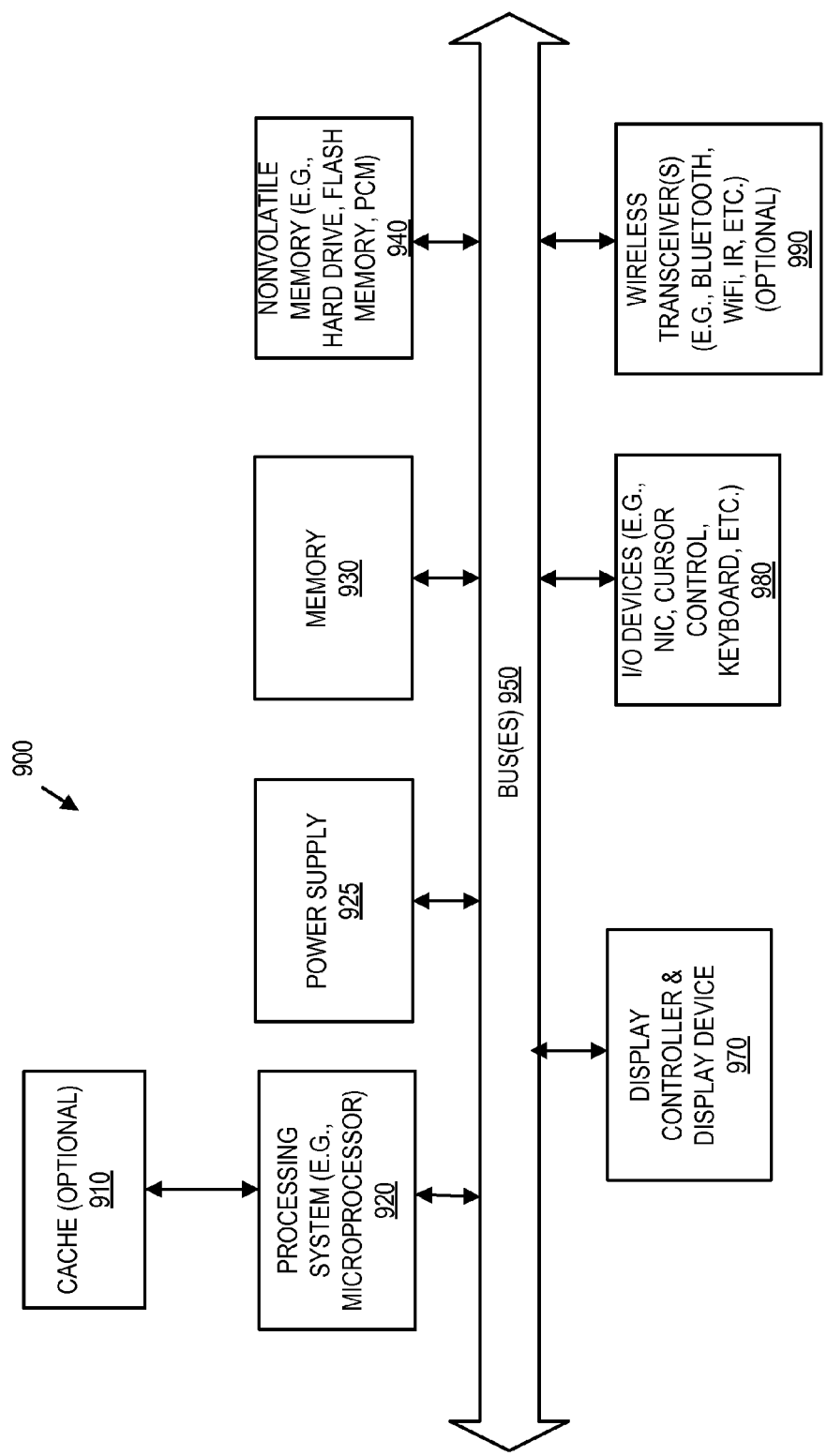
FIG. 9 illustrates a computer system that may be used in some embodiments.

As illustrated in FIG. 9, the computer system 900, which is a form of a data processing system, includes the bus(es) 950 which is coupled with the processing system 920, power supply 925, memory 930, and the nonvolatile memory 940 (e.g., a hard drive, flash memory, Phase-Change Memory (PCM), etc.). The bus(es) 950 may be connected to each other through various bridges, controllers, and/or adapters as is well known in the art. The processing system 920 may retrieve instruction(s) from the memory 930 and/or the nonvolatile memory 940, and execute the instructions to perform operations described herein. The bus 950 interconnects the above components together and also interconnects those components to the display controller & display device 970, Input/Output devices 980 (e.g., NIC (Network Interface Card), a cursor control (e.g., mouse, touchscreen, touchpad, etc.), a keyboard, etc.), and the optional wireless transceiver(s) 990 (e.g., Bluetooth, WiFi, Infrared, etc.). In one embodiment, the client device 110, the proxy server 120, and/or the origin server 130 can take the form of the computer system 900.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While embodiments described herein refer to adding an image preloader to the head start chunk, in other embodiments other preloader(s) in addition to, or in lieu of, the image preloader may be added to the head start chunk (e.g., other network resource preloader(s)).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a proxy server for reducing loading time of web pages, comprising:
   receiving, at the proxy server, a first request for a first web page, wherein the first request originates from a first client network application of a first client device;
   determining that there is a first portion of the first web page that is locally available in cache to the proxy server, wherein the first portion of the first web page is not the entire first web page, and wherein the first portion of the first web page reflects a prediction of a continuous portion of the first web page from a beginning of the first web page that will remain static if the first web page is reloaded and if the first web page is requested by a different client device and includes one or more expected static elements that are located after one or more expected dynamic elements in the first web page and that have been moved into the first portion of the first web page by the proxy server thereby increasing a length of the first portion;
   retrieving the first portion of the first web page from the cache;
   generating a first response to transmit to the first client network application of the first client device, the first response including an OK status code and including the first portion of the first web page retrieved from the cache;

transmitting the generated first response to the first client network application of the first client device prior to receiving the entire first web page from a first origin server that maintains the first web page;
transmitting a second request for the first web page to the first origin server;
receiving a second response from the first origin server that includes the first web page;
modifying the received first web page by removing a second portion from the received first web page, the second portion corresponding to the first portion transmitted to the first client network application of the first client device; and
transmitting the modified first web page to the first client network application of the first client device.

2. The method of claim 1, further comprising:
wherein the second response further includes one or more cookies set by the first origin server in one or more headers; and
transmitting the one or more cookies to the first client network application of the first client device in a trailer that includes one or more headers.

3. The method of claim 1, further comprising:
wherein the second response further includes one or more cookies set by the first origin server in one or more headers; and
prior to transmitting the modified first web page to the first client network application of the first client device, further modifying the first web page to include a client-side script that, when executed by the first client network application of the first client device, sets the one or more cookies programmatically.

4. The method of claim 1, wherein the first portion of the first web page does not include information beyond a closing head tag of the first web page.

5. The method of claim 1, wherein the proxy server is one of a plurality of proxy servers that are anycasted to a same IP address, and wherein the proxy server receives the first request for the first web page as a result of an Anycast implementation selecting the proxy server as closest to the first client device in terms of a routing protocol metric.

6. The method of claim 1, wherein prior to modifying the received first web page by removing the second portion from the received first web page, determining that the first portion and the second portion are the same.

7. The method of claim 6, further comprising:
wherein the second portion of the received first web page includes one or more static elements and one or more dynamic elements; and
wherein prior to determining that the first portion and the second portion are the same, reordering one or more elements of the received requested first web page such that the one or more static elements are prior to the one or more dynamic elements.

8. The method of claim 1, further comprising:
receiving, at the proxy server, a third request for a second web page, wherein the third request originates from a second client network application of a second client device;
determining that there is a first portion of the second web page that is locally available in cache to the proxy server, wherein the first portion of the second web page is not the entire second web page, and wherein the first portion of the second web page reflects a prediction of a portion of the second web page that will remain static if the second web page is reloaded and if the second web page is requested by a different client device;
retrieving the first portion of the second web page from the cache;
generating a third response to transmit to the second client network application of the second client device, the third response including an OK status code and including the first portion of the second web page retrieved from the cache;
transmitting the generated third response to the second client network application of the second client device prior to receiving the entire second web page from a second origin server that maintains the second web page;
transmitting a fourth request for the second web page to the second origin server;
responsive to determining that a response with the second web page from the second origin server is not received in response to transmitting the fourth request, performing the following:
transmitting a client-side script to the second client network application of the second client device, wherein the client-side script is configured to, when executed by the second client network application of the second client device, issue a fifth request for the second web page that is received by the proxy server and that directs the proxy server to not return the first portion of the second web page from the cache but rather return a response from the second origin server.

9. The method of claim 1, wherein the first portion of the first web page that is locally available in cache to the proxy server also includes an image preloader added by the proxy server, the image preloader being configured to, when executed by the first client network application of the first client device, transmit one or more requests for one or more images respectively that are referenced by the image preloader, wherein the one or more images are referenced in a part of the first web page different than the first portion of the first web page.

10. An apparatus, comprising:
a proxy server including a set of one or more processors and a set of one or more non-transitory computer-readable storage mediums storing instructions, that when executed by the set of processors, cause the set of processors to perform the following
receive, at the proxy server, a first request for a first web page, wherein the first request originates from a first client network application of a first client device;
determine that there is a first portion of the first web page that is locally available in cache to the proxy server, wherein the first portion of the first web page is not the entire first web page, and wherein the first portion of the first web page reflects a prediction of a continuous portion of the first web page from a beginning of the first web page that will remain static if the first web page is reloaded and if the first web page is requested by a different client device and includes one or more expected static elements that are located after one or more expected dynamic elements in the first web page and that have been moved into the first portion of the first web page by the proxy server thereby increasing a length of the first portion;
retrieve the first portion of the first web page from the cache;
generate a first response to transmit to the first client network application of the first client device, the first response including an OK status code and including the first portion of the first web page retrieved from cache;

transmit the generated first response to the first client network application of the first client device prior to receiving the entire first web page from a first origin server that maintains the first web page;

transmit a second request for the first web page to the first origin server;

receive a second response from the first origin server that includes the first web page;

modify the received first web page by removing a second portion from the received first web page, the second portion corresponding to the first portion transmitted to the first client network application of the first client device; and transmit the modified first web page to the first client network application of the first client device.

11. The apparatus of claim 10, wherein the set of non-transitory computer-readable storage mediums further stores instructions, that when executed by the set of processors, cause the set of processors to perform the following operations:

wherein the second response further includes one or more cookies set by the first origin server in one or more headers; and transmit the one or more cookies to the first client network application of the first client device in a trailer that includes one or more headers.

12. The apparatus of claim 10, wherein the set of non-transitory computer-readable storage mediums further stores instructions, that when executed by the set of processors, cause the set of processors to perform the following operations:

wherein the second response further includes one or more cookies set by the first origin server in one or more headers; and prior to transmission of the modified first web page to the first client network application of the first client device, further modify the first web page to include a client-side script that, when executed by the first client network application of the first client device, sets the one or more cookies programmatically.

13. The apparatus of claim 10, wherein the first portion of the first web page does not include information beyond a closing head tag of the first web page.

14. The apparatus of claim 10, wherein the proxy server is one of a plurality of proxy servers that are anycasted to a same IP address, and wherein the proxy server is to receive the first request for the first web page as a result of an Anycast implementation selecting the proxy server as closest to the first client device in terms of a routing protocol metric.

15. The apparatus of claim 10, wherein the set of non-transitory computer-readable storage mediums further stores instructions, that when executed by the set of processors, cause the set of processors to perform the following operation:

wherein prior to modification of the received first web page by removing the second portion from the received first web page, determining that the first portion and the second portion are the same.

16. The apparatus of claim 15, wherein the set of non-transitory computer-readable storage mediums further stores instructions, that when executed by the set of processors, cause the set of processors to perform the following operations:

wherein the second portion of the received first web page includes one or more static elements and one or more dynamic elements; and wherein prior to determining that the first portion and the second portion are the same, reordering one or more elements of the received requested first web page such that the one or more static elements are prior to the one or more dynamic elements.

17. The apparatus of claim 10, wherein the set of non-transitory computer-readable storage mediums further stores instructions, that when executed by the set of processors, cause the set of processors to perform the following operations:

receive, at the proxy server, a third request for a second web page, wherein the third request originates from a second client network application of a second client device;

determine that there is a first portion of the second web page that is locally available in cache to the proxy server, wherein the first portion of the second web page is not the entire second web page, and wherein the first portion of the second web page reflects a prediction of a portion of the second web page that will remain static if the second web page is reloaded and if the second web page is requested by a different client device;

retrieve the first portion of the second web page from the cache;

generate a third response to transmit to the second client network application of the second client device, the third response including an OK status code and including the first portion of the second web page retrieved from cache;

transmit the generated third response to the second client network application of the second client device prior to receiving the entire second web page from a second origin server that maintains the second web page;

transmit a fourth request for the second web page to the second origin server;

responsive to a determination that a response with the second web page from the second origin server is not received in response to transmission of the fourth request, perform the following:

transmit a client-side script to the second client network application of the second client device, wherein the client-side script is configured to, when executed by the second client network application of the second client device, issue a fifth request for the second web page that is to be received by the proxy server and that is to direct the proxy server to not return the first portion of the second web page from the cache but rather return a response from the second origin server.

18. The apparatus of claim 10, wherein the first portion of the first web page that is locally available in cache to the proxy server also includes an image preloader added by the proxy server, the image preloader being configured to, when executed by the first client network application of the first client device, transmit one or more requests for one or more images respectively that are referenced by the image preloader, wherein the one or more images are referenced in a part of the first web page different than the first portion of the first web page.

19. A non-transitory computer-readable storage medium that provides instructions that, if executed by a processor of a proxy server, will cause said processor to perform operations comprising:

receiving, at the proxy server, a first request for a first web page, wherein the first request originates from a first client network application of a first client device;

determining that there is a first portion of the first web page that is locally available in cache to the proxy server, wherein the first portion of the first web page is not the entire first web page, and wherein the first portion of the first web page reflects a prediction of a continuous portion of the first web page from a beginning of the first web page that will remain static if the first web page is reloaded and if the first web page is requested by a different client device and includes one or more expected static elements that are located after one or more expected dynamic elements in the first web page and that have been moved into the first portion of the first web page by the proxy server thereby increasing a length of the first portion;

retrieving the first portion of the first web page from the cache;

generating a first response to transmit to the first client network application of the first client device, the first response including an OK status code and including the first portion of the first web page retrieved from the cache;

transmitting the generated first response to the first client network application of the first client device prior to receiving the entire first web page from a first origin server that maintains the first web page;

transmitting a second request for the first web page to the first origin server;

receiving a second response from the first origin server that includes the first web page;

modifying the received first web page by removing a second portion from the received first web page, the second portion corresponding to the first portion transmitted to the first client network application of the first client device; and transmitting the modified first web page to the first client network application of the first client device.

20. The non-transitory computer-readable storage medium of claim 19, wherein the non-transitory computer-readable storage medium further stores instructions, that when executed by the processor, cause the processor to perform the following operations:
wherein the second response further includes one or more cookies set by the first origin server in one or more headers; and
transmitting the one or more cookies to the first client network application of the first client device in a trailer that includes one or more headers.

21. The non-transitory computer-readable storage medium of claim 19, wherein the non-transitory computer-readable storage medium further stores instructions, that when executed by the processor, cause the processor to perform the following operations:
wherein the second response further includes one or more cookies set by the first origin server in one or more headers; and
prior to transmitting the modified first web page to the first client network application of the first client device, further modifying the first web page to include a client-side script that, when executed by the first client network application of the first client device, sets the one or more cookies programmatically.

22. The non-transitory computer-readable storage medium of claim 19, wherein the first portion of the first web page does not include information beyond a closing head tag of the first web page.

23. The non-transitory computer-readable storage medium of claim 19, wherein the proxy server is one of a plurality of proxy servers that are anycasted to a same IP address, and wherein the proxy server receives the first request for the first web page as a result of an Anycast implementation selecting the proxy server as closest to the first client device in terms of a routing protocol metric.

24. The non-transitory computer-readable storage medium of claim 19, wherein the non-transitory computer-readable storage medium further stores instructions, that when executed by the processor, cause the processor to perform the following operation, wherein prior to modifying the received first web page by removing the second portion from the received first web page, determining that the first portion and the second portion are the same.

25. The non-transitory computer-readable storage medium of claim 24, wherein the non-transitory computer-readable storage medium further stores instructions, that when executed by the processor, cause the processor to perform the following operations:
wherein the second portion of the received first web page includes one or more static elements and one or more dynamic elements; and
wherein prior to determining that the first portion and the second portion are the same, reordering one or more elements of the received requested first web page such that the one or more static elements are prior to the one or more dynamic elements.

26. The non-transitory computer-readable storage medium of claim 19, wherein the non-transitory computer-readable storage medium further stores instructions, that when executed by the processor, cause the processor to perform the following operations:
receiving, at the proxy server, a third request for a second web page, wherein the third request originates from a second client network application of a second client device;
determining that there is a first portion of the second web page that is locally available in cache to the proxy server, wherein the first portion of the second web page is not the entire second web page, and wherein the first portion of the second web page reflects a prediction of a portion of the second web page that will remain static if the second web page is reloaded and if the second web page is requested by a different client device;
retrieving the first portion of the second web page from the cache;
generating a third response to transmit to the second client network application of the second client device, the third response including an OK status code and including the first portion of the second web page retrieved from cache;
transmitting the generated third response to the second client network application of the second client device prior to receiving the entire second web page from a second origin server that maintains the second web page;
transmitting a fourth request for the second web page to the second origin server;
responsive to determining that a response with the second web page from the second origin server is not received in response to transmitting the fourth request, performing the following:
transmitting a client-side script to the second client network application of the second client device, wherein the client-side script is configured to, when executed by the second client network application of the second client device, issue a fifth request for the second web page that is received by the proxy server and that directs the proxy server to not return the first portion of the second web page from the cache but rather return a response from the second origin server.

27. The non-transitory computer-readable storage medium of claim 19, wherein the first portion of the first web page that is locally available in cache to the proxy server also includes an image preloader added by the proxy server, the image preloader being configured to, when executed by the first client network application of the first client device, transmit one or more requests for one or more images respectively that are referenced by the image preloader, wherein the one or more images are referenced in a part of the first web page different than the first portion of the first web page.

* * * * *